United States Patent [19]
Tenmyo

[11] Patent Number: 5,926,658
[45] Date of Patent: *Jul. 20, 1999

[54] ILLUMINATION DEVICE AND PHOTOGRAPHING APPARATUS

[75] Inventor: Yoshiharu Tenmyo, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/886,555

[22] Filed: Jul. 1, 1997

[30] Foreign Application Priority Data

Jul. 4, 1996 [JP] Japan .................................. 8-195680

[51] Int. Cl.$^6$ .................................................. G03B 15/03
[52] U.S. Cl. ........................................... 396/177; 396/200
[58] Field of Search ..................................... 396/155, 164, 396/174, 175, 176, 177, 178, 198, 199, 200; 362/241 P

[56] References Cited

FOREIGN PATENT DOCUMENTS

| | | |
|---|---|---|
| 59-165037 | 9/1984 | Japan . |
| 4-16833 | 1/1992 | Japan . |
| 7-98479 | 4/1995 | Japan . |

*Primary Examiner*—Daniel P. Malley
*Assistant Examiner*—Nicholas J. Tuccillo
*Attorney, Agent, or Firm*—Fitzpatrick, Cella, Harper & Scinto

[57] ABSTRACT

An illuminating device comprises a light source and a light guide member which allows light supplied by the light source to enter the light guide member and guides the light to a predetermined light exit position while totally reflecting the light in the light guide member, the light guide member having, in a vicinity of a light entrance surface of the light guide member, a nonuniform refractive index distribution for making a light distribution characteristic different between a light entrance side and a light exit side. A photographing apparatus comprises a photographing optical system for photographing an image of an object and an illuminating system for illuminating the object. The illuminating system includes a light source and a light guide member which allows light supplied by the light source to enter the light guide member and guides the light to a predetermined light exit position while totally reflecting the light in the light guide member, the light guide member having, in a vicinity of a light entrance surface of the light guide member, a nonuniform refractive index distribution for making a light distribution characteristic different between a light entrance side and a light exit side.

25 Claims, 11 Drawing Sheets

F I G. 6
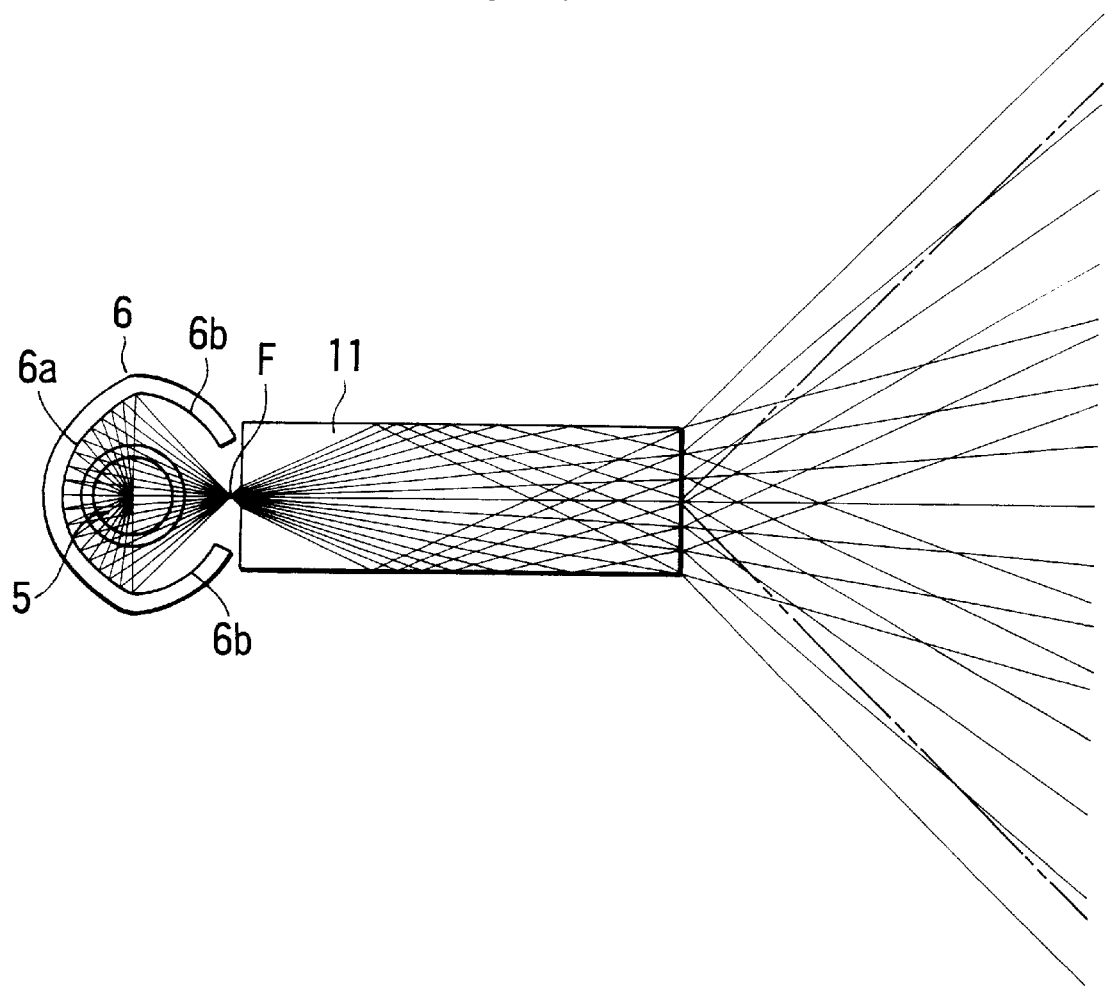

ILLUMINATION DEVICE AND PHOTOGRAPHING APPARATUS

BACKGROUND OF THE INVENTION

1. Field of the Invention

The present invention relates to an illuminating device capable of efficiently controlling light emitted from a light source, and to a photographing apparatus having the same.

2. Description of Related Art

A known type of illuminating device for projecting light from a light source onto a subject via an optical path in which the light is reflected a plurality of times is disclosed in, for example, Japanese Laid-Open Patent Application No. Hei 4-16833. This illuminating device is intended to obtain diffused light for a subject lying at a short distance, and is arranged to diffuse light rays emitted from a light source by reflecting the light rays a plurality of times by means of a plurality of plane mirrors disposed approximately in parallel at the front of the light source, and to project the diffused light rays onto the subject lying at the short distance.

Another known type of illuminating device is proposed in Japanese Laid-Open Patent Application No. Sho 59-165037. In this illuminating device, light rays emitted from a flash emission tube are gathered to form a flat beam at a light gathering part adjacent to which bundled optical fibers are appropriately disposed so that a predetermined light intensity distribution can be obtained.

However, the former conventional example has the problem that since the plane mirrors disposed approximately in parallel and having a diffusion effect are used as a light guide path, light losses are liable to occur during reflection at the mirror surfaces. This conventional example, because of its light intensity reducing capability, is convenient for photography during which a subject at a short distance needs to be illuminated, such as close-up photography, but has the disadvantage of being unsuited to the purpose of efficiently gathering light to illuminate a subject lying at a long distance.

In the latter conventional example, the light entrance portions of the optical fibers are disposed at a position where the light rays from the flash emission tube are to be focused by a reflector, so that the light rays can be guided to the light exit portions of the optical fibers. However, this conventional example has the problem that since the optical fibers cannot be closely laid because of their cylindrical shapes, the loss of an amount of light occurs. In addition, there are other problems, such as the optical fibers being extremely expensive and light distribution characteristics being impossible to control within the optical fibers (the state of light gathering being impossible to vary between a light entrance side and a light exit side).

BRIEF SUMMARY OF THE INVENTION

It is, therefore, an object of the present invention to provide an illuminating device which uses a light guide member having a light entrance surface and a light exit surface which are disposed at positions separate from each other, and which is capable of performing control of the distribution characteristic of light within a light guide path irrespective of the shape of the light guide path and has a high illumination efficiency.

To achieve the above object, in accordance with one aspect of the present invention, there is provided an illuminating device which comprises a light source and a light guide member which allows light supplied by the light source to enter the light guide member and guides the light to a predetermined light exit position while totally reflecting the light in the light guide member, the light guide member having, in a vicinity of a light entrance surface of the light guide member, a nonuniform refractive index distribution for making a light distribution characteristic different between a light entrance side and a light exit side.

In accordance with another aspect of the present invention, there is provided a photographing apparatus which comprises a photographing optical system for photographing an image of an object and an illuminating system for illuminating the object, the illuminating system including a light source and a light guide member which allows light supplied by the light source to enter the light guide member and guides the light to a predetermined light exit position while totally reflecting the light in the light guide member, the light guide member having, in a vicinity of a light entrance surface of the light guide member, a nonuniform refractive index distribution for making a light distribution characteristic different between a light entrance side and a light exit side.

The above and other objects, features and advantages of the present invention will become apparent from the following detailed description of preferred embodiments of the present invention, taken in conjunction with the accompanying drawings.

BRIEF DESCRIPTION OF THE SEVERAL VIEWS OF THE DRAWING

FIG. 6 is a diagrammatic comparative cross-sectional view aiding in explaining the illuminating system according to the first embodiment of the present invention;

DETAILED DESCRIPTION OF THE INVENTION

Preferred embodiments of the present invention will be described below in detail with reference to the accompanying drawings.

First Embodiment

Figure 1:
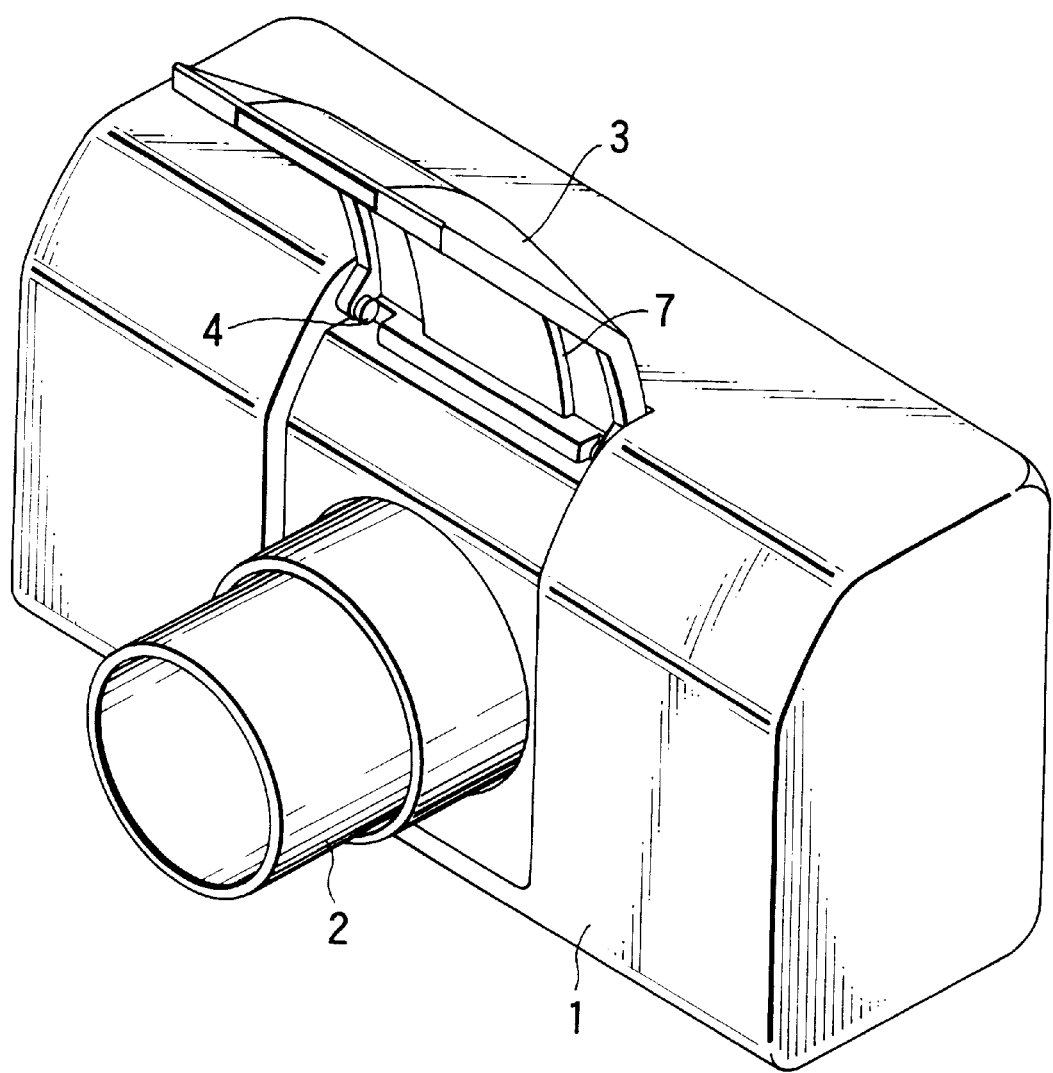
FIG. 1 is a diagrammatic perspective view of the whole of a camera according to a first embodiment of the present invention.
Figure 2:
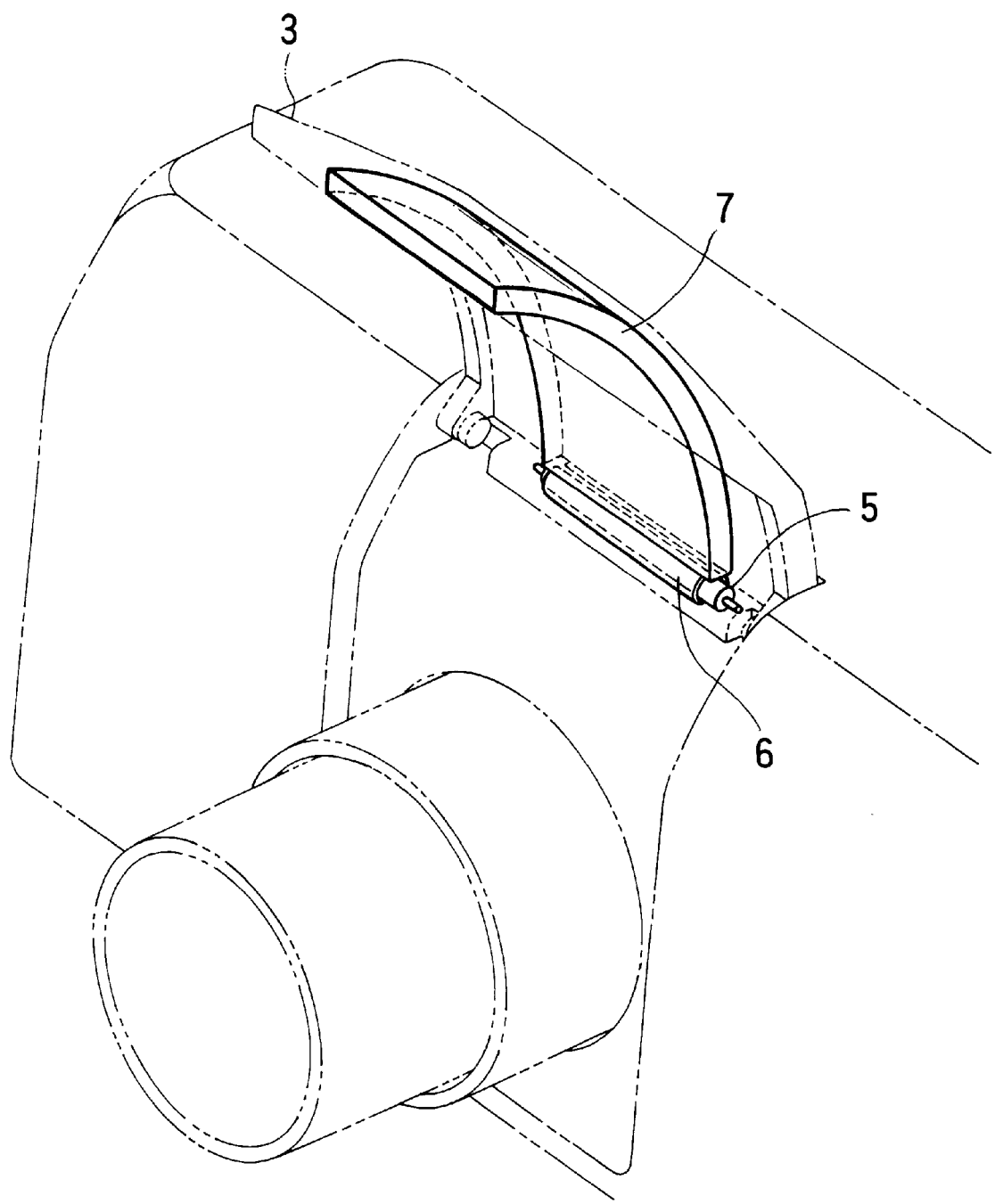
FIG. 2 is a diagrammatic perspective view showing only an illuminating system according to the first embodiment of the present invention.
Figure 3:
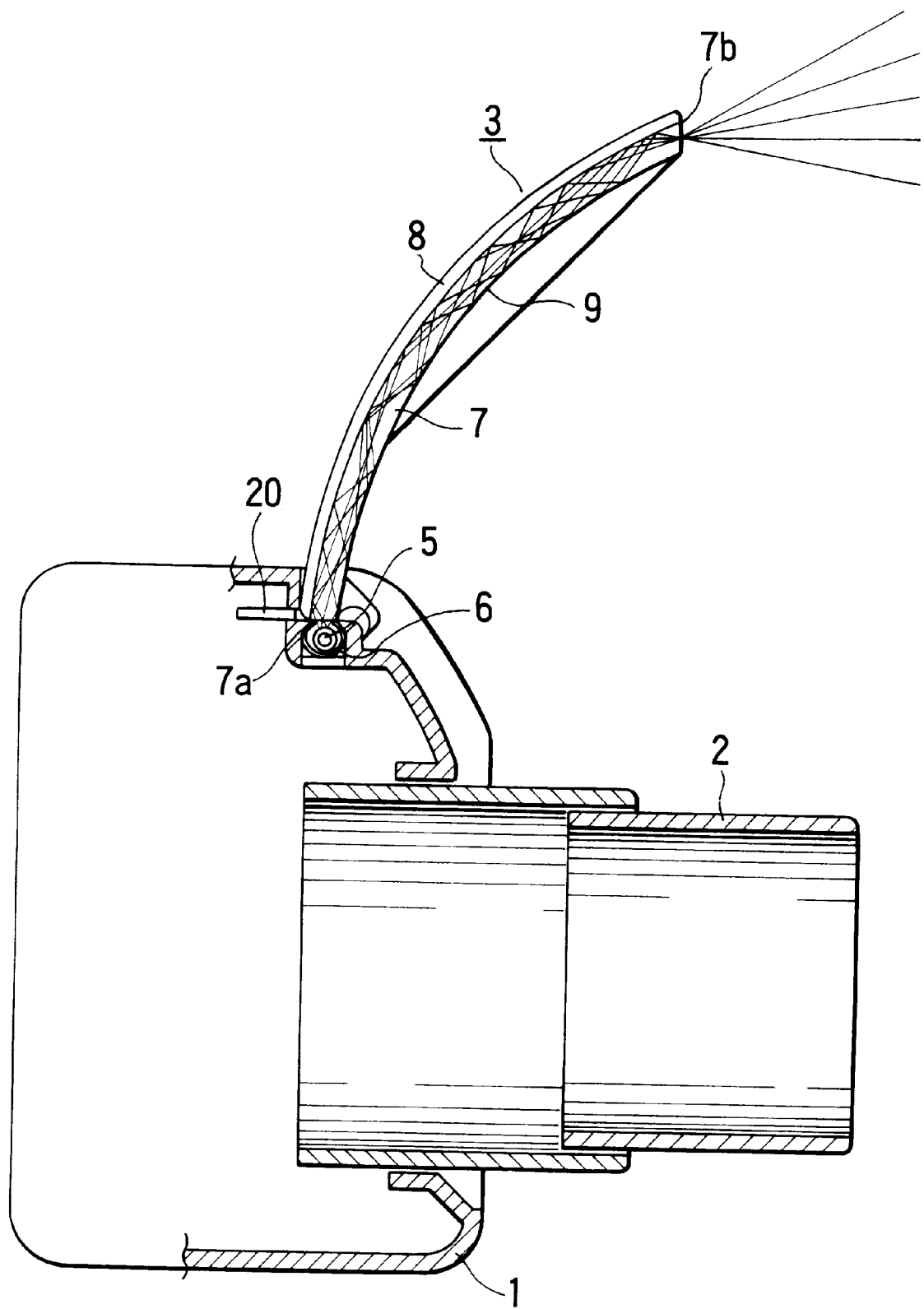
FIG. 3 is a diagrammatic cross-sectional view showing the state in which the camera according to the first embodiment of the present invention is in use.
Figure 4:
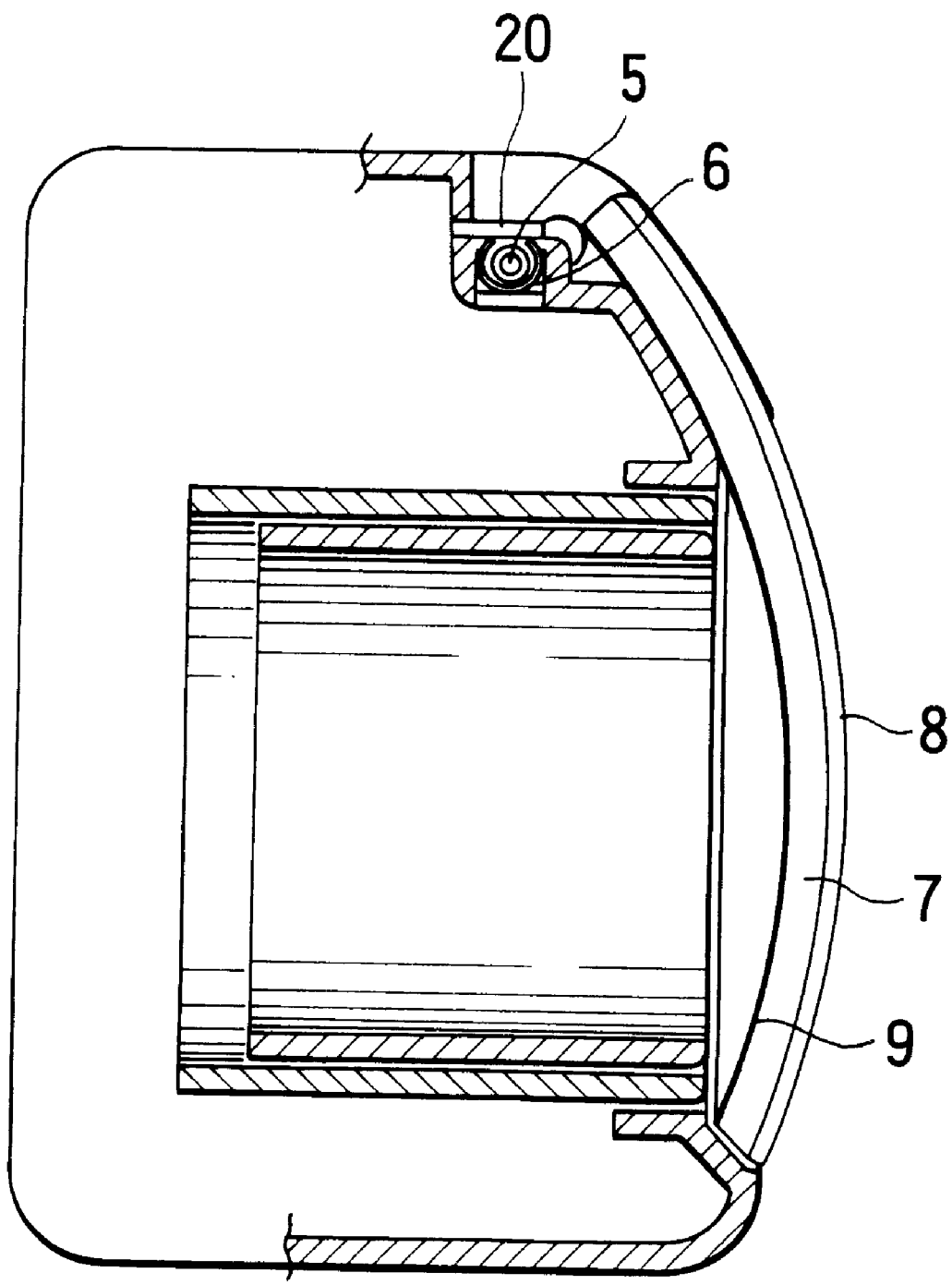
FIG. 4 is a diagrammatic cross-sectional view showing the portable state of the camera according to the first embodiment of the present invention.

FIGS. 1 to 4 are diagrammatic views showing the arrangement of a photographic camera to which an illuminating device according to a first embodiment of the present invention is applied. FIG. 1 is a diagrammatic perspective view of the entire camera, FIG. 2 is an enlarged perspective view of an essential portion of the camera shown in FIG. 1, FIG. 3 is a diagrammatic cross-sectional view showing the photography-enabled state of the camera, and FIG. 4 is a diagrammatic cross-sectional view showing the photography-disabled state of the camera.

The arrangement shown in FIG. 1 includes a camera body 1, a photographing lens barrel part 2, and a lens barrel barrier 3 which protects the photographing lens barrel part 2 when the photographing lens barrel part 2 is retracted as shown in FIG. 4. As shown in FIG. 3, during the photography-enabled state, the lens barrel barrier 3 is rotated upwardly about a hinge part 4 provided in an upper portion of the camera body 1 and is fixedly held at a predetermined position.

A flash emission part is disposed in the inside of the camera body 1. As shown in FIG. 2, the flash emission part includes a flash emission tube 5 which serves as a light source and a reflector 6 which serves as a light gathering member for gathering light rays emitted from the flash emission tube 5. A light guide member 7, which guides to a predetermined exit position the light rays entering from the flash emission part disposed in the inside of the camera body 1, is disposed within the lens barrel barrier 3.

Referring to the cross-sectional views shown in FIGS. 3 and 4, an exterior member 8 holds one side of the light guide member 7 and forms part of the lens barrel barrier 3, and a holding member 9 holds the side of the light guide member 7 opposite to the exterior member 8 and is fixed to the exterior member 8. The light guide member 7 is held in the state of being separate from the exterior member 8 and the holding member 9 by a predetermined distance, so that the light guide member 7 is prevented from being damaged by external forces and light losses due to contact with a hand or other matter are prevented.

An opening/closing member 20 for the flash emission part is provided in the camera body 1. As shown in FIG. 3, during the photography-enabled state, the opening/closing member 20 is retracted from the light exit side of the flash emission part by being driven by a mechanism member (not shown) provided in the camera body 1, in accordance with the movement of the lens barrel barrier 3. On the other hand, during the photography-disabled state, the opening/closing member 20 is moved to a position at which it covers the light exit side of the flash emission part as shown in FIG. 4, thereby preventing foreign matter such as dust from entering the flash emission part or the vicinity thereof when the camera body 1 is not in use.

FIG. 3 also shows the ray tracing of representative light rays exiting from the flash emission tube 5. As shown in FIG. 3, light rays exiting from the flash emission tube 5 enter the light guide member 7 through a light entrance surface 7a and, after having repeated total reflections, exit from the light guide member 7 through a light exit surface 7b. The light guide member 7 can be formed into a shape corresponding to the external appearance of the exterior member 8 as shown in FIG. 3, but the light distribution characteristic of the light guide member 7 is not easy to control without giving a variation to the thickness of the light guide member 7. Control of the light distribution characteristic according to the present invention will be described below.

Figure 5:
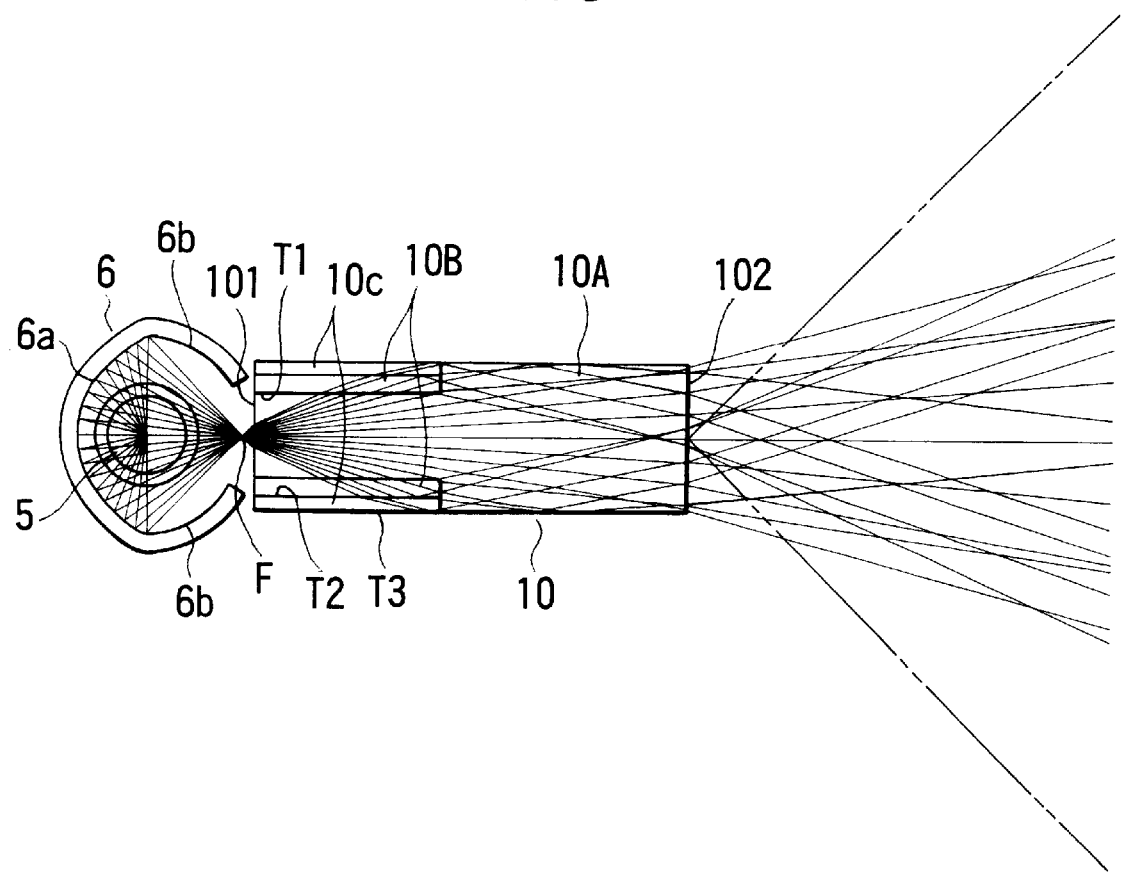
FIG. 5 is a diagrammatic cross-sectional view aiding in explaining the illuminating system according to the first embodiment of the present invention.

FIGS. 5 and 6 are explanatory views of the process of varying the light gathering characteristic (the light distribution characteristic) of the light guide member 7 by making use of a variation in the refractive index distribution within the light guide member 7. FIG. 5 is a cross-sectional view of the flash emission part, taken in a direction perpendicular to a flash emission tube 5 of cylindrical shape, and FIG. 6 is a cross-sectional view of a flash emission part in which a material of uniform refractive index distribution which exhibits no variation in refractive index distribution is used for the light guide member by way of comparison.

As shown in FIGS. 5 and 6, the reflector 6 which focuses the light rays emitted from the flash emission tube 5 is formed by a rearward portion (as viewed in the light exiting direction) which has an elliptical cross section focused on the center of the flash emission tube 5 and a forward portion (as viewed in the light exiting direction) which has a cylindrical cross section centered about the flash emission tube 5.

In FIG. 5, for ease of description, a light guide member 10 is shown as a flat member which is shorter than the light guide member 7 shown in FIGS. 1 to 4. The light guide member 10 is formed by three layers 10A, 10B and 10C having different refractive indices. The layer 10A is a layer of higher refractive index which extends from a light entrance surface 101 to a light exit surface 102 (hereinafter referred to as the higher refractive index layer). The layer 10C is a layer of lower refractive index (a lower refractive index layer) which is formed as an outermost portion extending partway from the light entrance surface 101. The layer 10B is a layer having a middle refractive index between the refractive indices of both layers 10A and 10C (a middle refractive index layer). The middle refractive index layer 10B and the lower refractive index layer 10C are formed adjacently to the light entrance surface 101 and extend therefrom by only a predetermined length.

A light guide member 11, which is shown in FIG. 6 by way of comparison, is a member having a uniform refractive index distribution and uses a material identical to that of the higher refractive index layer 10A of the light guide member 10 for the purpose of facilitating comparison with the light guide member 10 of FIG. 5. Each of the light guide members 10 and 11 is made of glass or a transparent resin. The higher refractive index layer 10A and the middle refractive index layer 10B are fixed to each other at a boundary T1 by a transparent adhesion having a refractive index close to the refractive index of the layer 10A or 10B, and the middle refractive index layer 10B and the lower refractive index layer 10C are fixed to each other at a boundary T2 by a transparent adhesion having a refractive index close to the refractive index of the layer 10B or 10C.

The state of ray tracing through each of the light guide members 10 and 11 will be described below with reference to FIGS. 5 and 6. Referring first to FIG. 5, light rays emitted rearwardly from the center of the flash emission tube 5 which is disposed at a first focal position of an elliptic reflecting surface 6a are focused at a second focal position F of the elliptic reflecting surface 6a because of the elliptic shape of the reflecting surface 6a of the reflector 6. (For the sake of simplicity of description, it is assumed that the flash emission tube 5 has a sufficiently small glass thickness and the influence of refraction of the flash emission tube 5 itself is ignored). Since the light entrance surface 101 of the light guide member 10 is disposed in the vicinity of the second focal position F, the reflected light rays focused at the second focal position F enter the higher refractive index layer 10A located in the central portion of the light guide member 10. The light ray components of the reflected light rays that are refracted at the light entrance surface 101 and exit from the light entrance surface 101 at small exit angles travel through only the higher refractive index layer 10A and exit from the light exit surface 102. These light ray components are components which originally illuminate the approximately central portion of a subject, and are not subjected to further light gathering control and exit from the light exit surface 102 at angles which are the same as their incident angles on the light entrance surface 101. Among the light ray components which are refracted after having entered the light guide member 10, light ray components which travel from the higher refractive index layer 10A to the adjoining middle refractive index layer 10B exit from the light exit surface 102 at the same angles (absolute values) as their incident angles by being totally reflected at the boundary T1 if their incident angles relative to the middle refractive index layer 10B are not less than a predetermined value (critical angle). The category of succeeding control for such incident angles is determined by the ratio of the refractive index of one refractive index layer to the refractive index of the adjacent refractive index layer. In other words, a primary limitation on the illuminating angle of the light ray components after entrance is determined by such a refractive index ratio.

In the description of the example shown in FIG. 5, reference has been made to the light ray components which enter approximately the center of the higher refractive index layer 10A. However, light ray components which enter the higher refractive index layer 10A at positions offset from its center (or other light ray components entering at incident angles not greater than a predetermined angle, such as light ray components emitted from the flash emission tube 5 at positions offset from its center and light ray components due to direct light) also exit from the light exit surface 102 at the same angles as their incident angles owing to the aforesaid primary limitation (due to the boundary T1 between the higher refractive index layer 10A and the middle refractive index layer 10B).

Light ray components whose incident angles relative to the light entrance surface 101 are not less than the predetermined angle travel to the middle refractive index layer 10B, whereas light ray components having far greater incident angles travel to the lower refractive index layer 10C, so that both light ray components are subjected to different kinds of control.

The state of ray tracing in this case will be described below.

If light ray components enter the higher refractive index layer 10A at incident angles relative to the light entrance surface 101 which are not less than the predetermined angle (their incident angles at the boundary T1 are not less than the critical angle), the light ray components are refracted into the middle refractive index layer 10B without being totally reflected at the boundary T1 between the higher refractive index layer 10A and the middle refractive index layer 10B. At this time, since the entering light rays enter from the higher refractive index layer 10A into the middle refractive index layer 10B which has a lower refractive index than the layer 10A, the refracted light rays are converted into light ray components which travel in directions closer to light rays having small incident angles relative to the light entrance surface 101 (hereinafter referred to as the optical-axis direction(s) for convenience's sake). Part of the refracted light rays exit from the end face of the middle refractive index layer 10B immediately or after total reflection at the boundary T2 between the middle refractive index layer 10B and the lower refractive index layer 10C. Along this series of optical paths, the light rays are bent in the optical-axis directions and converted into light ray components to be accommodated within the required angle of view. In this case as well, by appropriately adjusting the refractive index ratio of the middle refractive index layer 10B to the lower refractive index layer 10C, it is possible to restrict the angle components of light ray components to be controlled.

Light ray components which are not totally reflected at the boundary T2 between the middle refractive index layer 10B and the lower refractive index layer 10C, i.e., light ray components which, in their initial states, have very large incident angles relative to the light entrance surface 101 of the light guide member 10, are refracted from the middle refractive index layer 10B into the lower refractive index layer 10C. The refracted light ray components exit from the end face of the lower refractive index layer 10C immediately or after total reflection at a boundary T3 between the lower refractive index layer 10C and the outside air. In this case as well, the refracted light rays are bent into the optical-axis directions similarly to the light rays which enter from the higher refractive index layer 10A into the middle refractive index layer 10B, and are thereby converted into light ray components to be accommodated within the required angle of view.

As described above, in the vicinity of the light entrance surface 101 of the light guide member 10, the higher refractive index layer 10A is disposed in the central portion of the light guide member 10, while the middle refractive index layer 10B and the lower refractive index layer 10C are disposed in the marginal portion of the light guide member 10. By setting the lengths of the refractive index layers 10B and 10C to predetermined lengths according to the characteristics of entering light rays, it is possible to cause light rays to exit from the light guide member 10 in the form of light rays which are uniform in direction, even if they enter the light guide member 10 in nonuniform travelling directions. That is to say, it is possible to illuminate the range of an arbitrary required angle of view.

Incidentally, the lengths and thicknesses of the refractive index layers 10B and 10C are selected so that light rays which have entered the refractive index layer 10B or 10C can be prevented from again entering a higher refractive index layer by total reflection. For this reason, the optimum values of such lengths and thicknesses differ according to the extent of nonuniformity of the angles of entering light rays, the extent of nonuniformity of the positions of entrance of light rays or the like.

The range of illumination by light rays exiting from the light guide member 10 is controlled by the refractive index ratios of the refractive index layers 10A to 10C as described above. In addition, the lengths of the middle and lower refractive index layers 10B and 10C are limited according to the refractive index value of the higher refractive index layer 10A which light rays first enters from the flash emission part.

Although in the above-described first embodiment the refractive index layers 10A, 10B and 10C of three kinds having higher, middle and lower refractive indices are set as refractive index layers, the kinds of refractive index layers are not limited to only such three kinds, and more finely classified refractive indices may be used so that finer control of light distribution can be realized and more uniform illumination can be achieved.

To verify the effect of the above-described first embodiment, ray tracing in each of the examples shown in FIGS. 5 and 6 was obtained under the same conditions. In the example shown in FIG. 6 which uses the light guide member 11 made of a material having a single refractive index, light rays exit at the same angles (with the same light ray components) before and after the light rays enter the light guide member 11. (In each of FIGS. 5 and 6, the maximum angle component of the entering light rays is shown by two-dot chain lines on the side of the light exit surface 102 for the sake of clarity of illustration.)

In contrast, in the first embodiment, as is apparent from FIG. 5, light rays exit from the light exit surface 102 as a beam of light rays gathered at an angle which is extremely narrow with respect to the maximum angle (defined by two-dot chain lines) of the entering light rays. The representative light rays shown in FIG. 5 indicate those of a beam formed by light rays which are emitted from the central portion of the flash emission tube 5, reflected by the elliptic reflecting surface 6a and focused onto one point. However, since the size of the flash emission tube 5 is actually finite and there is an influence of refraction at the surface of the glass tube of the flash emission tube 5, actual light rays are not limited to only the shown light rays, and light rays of various angle components enter the higher refractive index layer 10A through the light entrance surface 101. In this case as well, a majority of light rays are correctly limited by the control of light rays similar to the above-described control, i.e., light ray components which enter the light guide member 10 at large incident angles are converted into light ray components of angle components closer to the optical-axis direction.

A desirable example of the arrangement of a light guide member based on the contents of the above description will be described below with reference to FIG. 7 together with actual numeral values.

Figure 7:
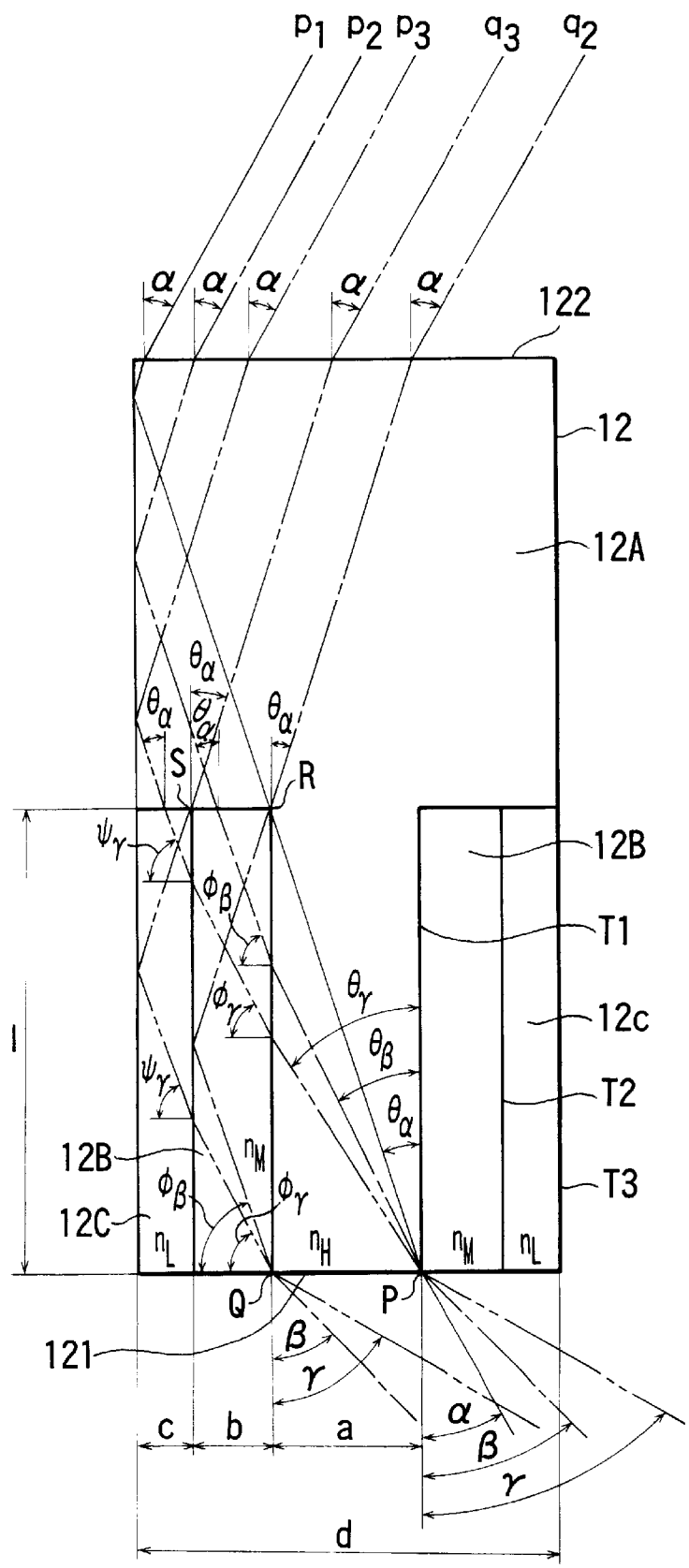
FIG. 7 is a diagrammatic cross-sectional view aiding in explaining the characteristic of a light guide member according to the first embodiment of the present invention.

As shown in FIG. 7, a light guide member 12 includes a flat plate formed by a material 12A of higher refractive index $n_H$, and a material 12B of middle refractive index $n_M$ and a material 12C of lower refractive index $n_L$ are respectively bonded to the opposite sides of the end portion of the flat plate on the light entrance side thereof. The light guide member 12 has a light entrance surface 121 and a light exit surface 122.

The constants required to determine the shape of the light guide member 12 are determined as follows. Light rays emitted from the flash emission tube 5 and focused by the reflector 6 enter the light guide member 12 within a particular narrow area. An entrance portion through which the light rays enter the light guide member 12 is assumed to have a width "a" defined between a point P and a point Q. It is also assumed that the middle refractive index layer 12B has a width "b"; the lower refractive index layer 12C has a width "c"; the light guide member 12 has a total width "d"; and each of the middle and lower refractive index layers 12B and 12C has a length "l". R and S indicate intersection points present on the side of the middle refractive index layer 12B opposite to the end face thereof, and a indicates the target value of the maximum illuminating angle of light rays exiting from the light guide member 12.

Basically, among the entering light rays, light ray components which enter the light guide member 12 at angles not greater than the angle α are controlled within only the higher refractive index layer 12A and exit from the light exit surface 122 at the same angles as their incident angles. The middle refractive index $n_M$ of the middle refractive index layer 12B is set so that if the incident angle is not greater than α, light rays which fall on the middle refractive index layer 12B are totally reflected by the middle refractive index layer 12B and do not enter the middle refractive index layer 12B.

Among the entering light rays, light ray components which enter the light guide member 12 at angles not less than α and not greater than β enter from the higher refractive index layer 12A into the middle refractive index layer 12B, but are totally reflected at the boundary T2 between the middle refractive index layer 12B and the lower refractive index layer 12C. Similarly, among the entering light rays, light ray components which enter the light guide member 12 at angles not less than β and not greater than γ enter from the higher refractive index layer 12A into both of the middle refractive index layer 12B and the lower refractive index layer 12C, and are totally reflected at the boundary T3 between the lower refractive index layer 12C and the outside air.

The entering light rays can be more efficiently gathered by satisfying, in addition to the above-described conditions, various other conditions such as the length "l" of each of the middle refractive index layer 12B and the lower refractive index layer 12C which is required to permit the light rays to enter the layers 12B and 12C so that all the light rays are controlled by the layers 12B and 12C, conditions for permitting the light rays exiting from the end faces of the middle refractive index layer 12B and the lower refractive index layer 12C to exit from the light guide member 12 at angles not greater than the predetermined angle α, and the thicknesses of the middle refractive index layer 12B and the lower refractive index layer 12C which are required to prevent the light rays entering the layer 12B or 12C from returning to a higher refractive index layer.

The required conditional or relational expressions are shown below.

Relational expressions for the light entrance surface 121:

$$\sin \alpha = n_N \cdot \sin \theta_\alpha, \qquad (1\text{-}1)$$

$$\sin \beta = n_N \cdot \sin \theta_\beta, \qquad (1\text{-}2)$$

$$\sin \gamma = n_N \cdot \sin \theta_\gamma. \qquad (1\text{-}3)$$

Conditional expressions (the length "l") for preventing the light ray components entering the middle refractive index layer 12B and the lower refractive index layer 12C from directly passing through the layers 12B and 12C:

$$\text{``l''} \geq a \cdot \tan(90° - \theta_\alpha), \tag{2-1}$$

$$\therefore \text{``l''} \geq \frac{a}{\tan\theta_\alpha}. \tag{2-2}$$

Conditional expressions for boundaries which cause variations in refractive index:

$$n_H \cdot \sin(90° - \theta_\beta) = n_M \cdot \sin\phi_\beta, \tag{3-1}$$

$$n_H \cdot \sin(90° - \theta_\gamma) = n_M \cdot \sin\phi_\gamma, \tag{3-2}$$

$$n_M \cdot \sin\phi_\gamma = n_L \cdot \sin\psi_\gamma. \tag{3-3}$$

Conditional expressions for making the maximum values of exiting light rays not greater than a target value (conditional expressions for making the exit angles of final exiting light rays not greater than α) if light rays again enter from the end faces of the middle refractive index layer 12B and the lower refractive index layer 12C into the higher refractive index layer 12A:

$$n_M \cdot \sin(90° - \phi_\beta) \leq n_H \cdot \sin\theta_\alpha, \tag{4-1}$$

$$n_L \cdot \sin(90° - \psi_\gamma) \leq n_H \cdot \sin\theta_\alpha. \tag{4-2}$$

Conditional expressions for preventing light rays from again entering the higher refractive index layer 12A after having entered and totally reflected by the middle refractive index layers 12B and 12C:

$$b \cdot \tan\phi_\beta \geq \frac{\text{``l''}}{2}, \tag{5-1}$$

$$c \cdot \tan\psi_\gamma \geq \frac{\text{``l''} - b \cdot \tan\phi_\gamma}{2}. \tag{5-2}$$

Conditional expressions for preventing light ray components which are not completely controlled from passing through the end faces of the middle refractive index layer 12B and the lower refractive index layer 12C:

$$a \cdot \tan(90° - \theta_\beta) \leq \frac{\text{``l''}}{2}, \tag{6-1}$$

$$c \cdot \tan\psi_\gamma \leq \text{``l''} - \frac{a}{\tan\theta_\gamma} - b \cdot \tan\phi_\gamma. \tag{6-2}$$

It is desirable to satisfy all of the above conditional expressions, but if all the conditional expressions are to be satisfied, a light guide member having an increased thickness and size will have to be used. The following examples are actual calculation examples which satisfy part of the above conditional expressions.

A first numerical calculation example of the first embodiment will be described below.

The width "a" of the light entrance portion, the refractive index $n_H$ of the higher refractive index layer 12A, and the maximum illuminating angle a of exiting light rays are respectively set to the following initial values:

a=2.0, $n_H$=1.60, α=30°.

To minimize the length "l" of each of the middle refractive index layer 12B and the lower refractive index layer 12C, the following conditional expression is obtained from the above expression (2-2):

$$\text{``l''} = \frac{a}{\tan\theta_\alpha}. \tag{7-1}$$

To increase the controllable maximum angle γ (so that the angle at which light rays exit from the end face of each of the layers 12B and 12C can be made coincident with a maximum value $\theta_\alpha$), the following conditional expressions are obtained from the above expression (4-1):

$$n_M \cdot \sin(90° - \phi_\beta) = n_N \cdot \sin\theta_\alpha, \tag{8-1}$$

$$n_L \cdot \sin(90° - \psi_\gamma) = n_H \cdot \sin\theta_\alpha. \tag{8-2}$$

To minimize the thickness of the light guide member by preventing light rays from again entering the higher refractive index layer 12A after having entered the middle refractive index layer 12B or the lower refractive index layer 12C, the following conditional expression is obtained from the above expression (5-1):

$$b \cdot \tan\phi_\beta = \frac{\text{``l''}}{2}, \tag{9-1}$$

and from the expression (5-2), $$c \cdot \tan\psi_\gamma = \frac{\text{``l''} - b \cdot \tan\phi_\gamma}{2}. \tag{9-2}$$

Conditional expressions for realizing total reflection at a predetermined angle in accordance with the above conditional expressions (3-1) to (3-3), i.e., conditional expressions for realizing total reflection at an incident angle a at the boundary T2 between the middle refractive index layer 12B and the lower refractive index layer 12C, become $\phi_\beta=0$ and $\psi_\gamma=0$, and the following expressions are obtained:

$$n_M = n_H \cdot \sin(90° - \theta_\alpha), \tag{10-1}$$

$$n_L = n_H \cdot \sin(90° - \theta_\beta). \tag{10-2}$$

Each of the constants are obtained from the above relations in the following order.

From the expressions (1-1) and (7-1), $$\text{``l''} = \frac{a}{\tan\left[\sin^{-1}\left(\frac{\sin\alpha}{n_H}\right)\right]}. \tag{11}$$

From the expressions (10-1) and (1-1), $$n_M = n_H \cdot \cos\left[\sin^{-1}\left(\frac{\sin\alpha}{n_H}\right)\right]. \tag{12}$$

From the expressions (1-1) and (8-1), $$\phi_\beta = \cos^{-1}\left(\frac{\sin\alpha}{n_M}\right), \tag{13-1}$$

$$\beta = \sin^{-1}\left[n_H \cdot \sin\left(\cos^{-1}\left(\frac{n_M}{n_H} \cdot \sin\phi_\beta\right)\right)\right]. \tag{13-2}$$

From the expression (9-1), $$b = \frac{"l"}{2\tan\phi_\beta}. \tag{14}$$

From the expressions (3-1), (1-1) and (8-1), $$\theta_\beta = \cos^{-1}\left[\frac{n_M}{n_H} \cdot \sin\left(\cos^{-1}\left(\frac{\sin\alpha}{n_M}\right)\right)\right]. \tag{15}$$

From the expression (10-2), $$n_L = n_H \cdot \sin(90° - \theta_\beta). \tag{16}$$

From the expressions (8-2) and (1-1), $$\psi_\gamma = \cos^{-1}\left(\frac{\sin\alpha}{n_L}\right). \tag{17-1}$$

From the expressions (3-3) and (1-3), $$\gamma = \sin^{-1}\left[n_H \cdot \sin\left(\cos^{-1}\left(\frac{n_L}{n_H} \cdot \sin\psi_\gamma\right)\right)\right]. \tag{17-2}$$

From the expressions (9-2) and (3-3), $$c = \frac{"l" - b \cdot \tan\left[\sin^{-1}\left(\frac{n_L}{n_H} \cdot \sin\psi_\gamma\right)\right]}{2 \cdot \tan\psi_\gamma}. \tag{18}$$

From FIG. 7, $$d = a + 2b + 2c. \tag{19}$$

From the above expressions, the following calculation results are obtained:

α=30.0°, β=45.0°, γ=59.9°, a=2.0,
b=1.06, c=0.75, d=5.62, "l"=6.08,
$n_H$=1.6000, $n_M$=1.5199, $n_L$=1.4353.

FIG. 7 is a view depicted on the basis of these numerical values.

If only the refractive index $n_H$ of the higher refractive index layer 12A is changed to $n_H$=1.5 and similar calculations are performed, the following second numerical calculation example is obtained:

α=30.0°, β=45.0°, γ=60.0°, a=2.0,
b=1.07, c=0.76, d=5.69, "l"=5.66,
$n_H$=1.5000, $n_M$=1.4142, $n_L$=1.3229.

In this example as well, approximately similar numerical values are obtained except that the length of each of the middle refractive index layer 12B and the lower refractive index layer 12C is 0.4 mm shorter.

In each of the above-described numerical calculation examples, the maximum illuminating angle of light rays emitting from the light guide member 12 is set to 30°, and each of the constants is set so that uniform light distribution can be achieved and losses can be made small. For this reason, the thickness of the light guide member 12 becomes large, but if the distribution of the light rays exiting from the light guide member 12 is center-weighted and a certain amount of light loss is acceptable, the light guide member 12 can be made far thinner.

As described above, a plurality of layers having different refractive indices are disposed in parallel, and the refractive index of the light entrance portion is made high, whereas the refractive index is made lower toward the margin of the light guide member. Accordingly, light rays entering the light guide member can be classified on the basis of their angle components, so that it is possible to individually control the directions of the classified light rays. If a multiplicity of layers having different refractive indices are disposed, it becomes possible to more finely control light rays and to make narrower the exit angles of final light rays exiting from the light guide member, and it also becomes possible to control light rays having wider angle components at the time of entrance into the light guide member.

A third numerical calculation example of the first embodiment will be described below. Although in the above-described first numerical calculation example the condition required for minimizing the length "l" of each of the middle refractive index layer 12B and the lower refractive index layer 12C is given by the conditional expression (7-1), the third numerical calculation example provides a shape which eliminates slight amounts of light ray components which pass through the end faces of the middle refractive index layer and the lower refractive index layer without being completely controlled in the first numerical calculation example.

To realize such a shape and shorten the lengths of the middle refractive index layer and the lower refractive index layer, the following conditional expressions are obtained from the conditional expressions (6-1) and (6-2):

$$a \cdot \tan(90° - \theta_\beta) = \frac{"l"}{2}, \tag{20-1}$$

$$c \cdot \tan\psi_\gamma = "l" - \frac{a}{\tan\theta_\gamma} - b \cdot \tan\phi_\gamma. \tag{20-2}$$

Predetermined values are calculated by using, in addition to these conditional expressions, the conditional expressions (8-1) and (8-2) for increasing the controllable maximum angle γ, the conditional expressions (9-1) and (9-2) for preventing light rays from again entering a higher refractive index layer after having entered a middle refractive index layer or a lower refractive index layer, the conditional expressions (10-1) and (10-2) for realizing total reflection at a predetermined angle, and the definition expressions (1-1) to (1-3) and (3-1) to (3-3) for each refracting surface.

The width "a" of a light entrance portion, the refractive index $n_H$ of a higher refractive index layer 13A, and the maximum illuminating angle α of exiting light rays are respectively set to the following values which are the same as the corresponding values used in the first numerical calculation example:

a=2.0, $n_H$=1.60, α=30°.

Figure 8:
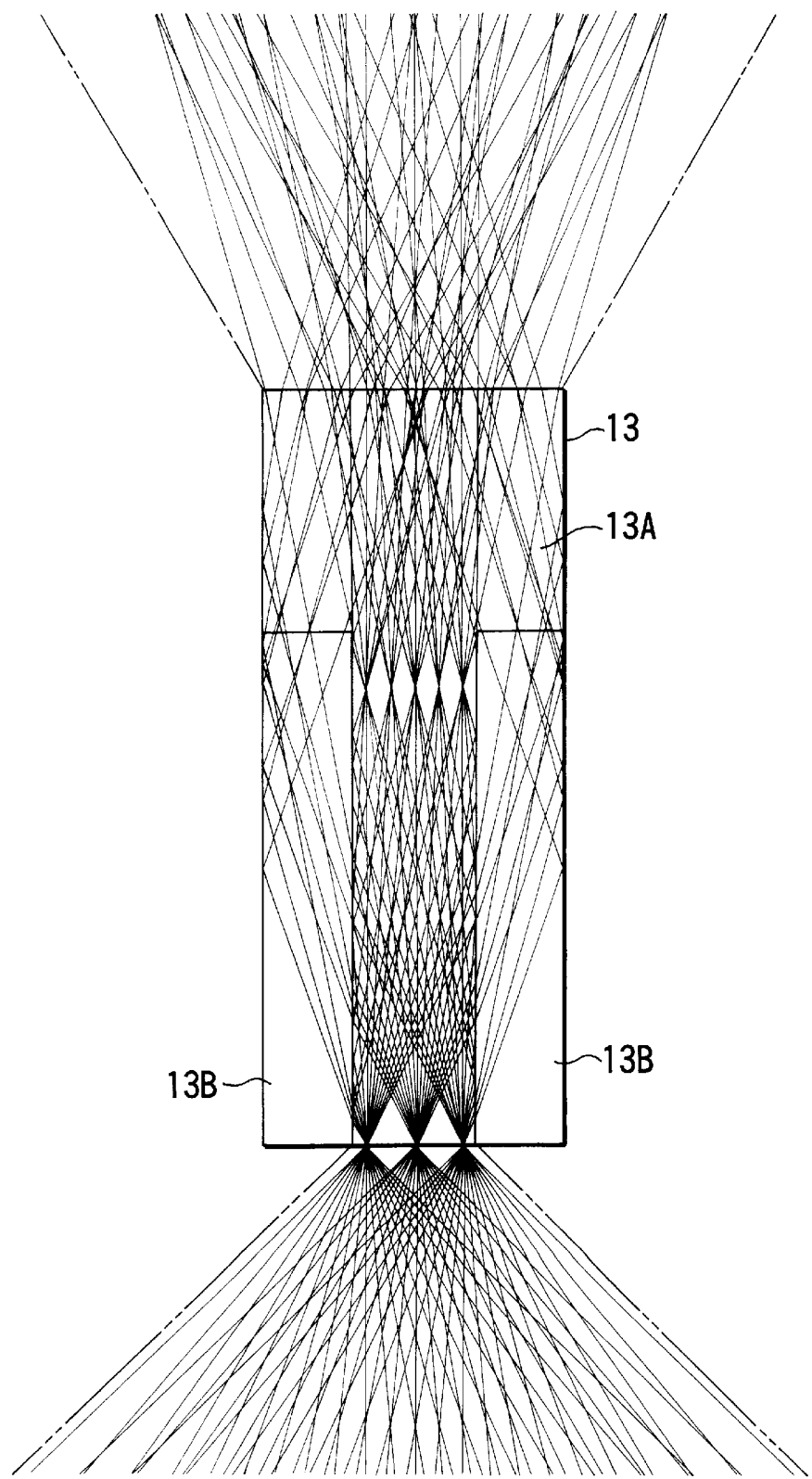
FIG. 8 is a diagrammatic cross-sectional view aiding in explaining the characteristic of another light guide member according to the first embodiment of the present invention.

If a lower refractive index layer 13B is formed as a single layer as shown in FIG. 8, the conditional expressions (1-1) and (10-1) give:

$$n_L = n_H \cdot \sin 90° - \sin^{-1}\frac{\sin\alpha}{n_H} = 1.5199,$$

the conditional expressions (8-1) and (1-1) give:

$$\phi_\beta = \cos^{-1}\frac{\sin\alpha}{n_L} = 70.7934,$$

the conditional expression (3-1) gives:

$$\phi_\beta = \cos^{-1}\frac{n_L}{n_H}\sin\phi_\beta = 26.2254,$$

the conditional expression (20-1) gives:

$$"l" = 2a \cdot \tan(90° - \theta_\beta) = 8.12,$$

the conditional expression (9-1) gives:

$$b = \frac{"l"}{2 \cdot \tan\phi_\beta} = 1.4144,$$

and the conditional expression (1-2) gives:

$$\beta = \sin^{-1}(n_N \cdot \sin\theta_\beta) = 44.9951,$$

$$d = a + 2b = 4.8288.$$

From the above results, the following calculation results are obtained:

$a = 30.0°$, $\beta = 45.0°$, $a = 2.0$, $b = 1.41$, $d = 4.83$, $"l" = 8.12$, $n_H = 1.6000$, $n_M = 1.5199$.

Therefore, the component of the illuminating angle (90°) within the predetermined area (width) "a" can be reduced to an illuminating angle of 60°.

Although each of the above-described light guide members has an arrangement intended to prevent the loss of the amount of light as completely as possible, the present invention is not limited to such an arrangement. For example, it is possible to adopt a light guide member in which a plurality of layers having different refractive indices are formed approximately in parallel with the optical-axis direction of the light guide member and a higher refractive index layer is disposed to extend from the central portion of the light entrance surface of the light guide member, whereas a lower refractive index layer is disposed in such a manner that its refractive index becomes lower from the central portion toward the marginal portion. With this arrangement, it is possible to achieve similar effects even if the thickness of the light guide member is unable to be made sufficiently large.

Second Embodiment

FIGS. 9 to 12 are views aiding in explaining a second embodiment of the present invention which varies its light-gathering characteristic by means of a refractive index variation within a light guide member. Since the entire arrangement of the second embodiment is similar to that of the first embodiment, the following description will refer to only the distinctive portions of the second embodiment.

Figure 9:
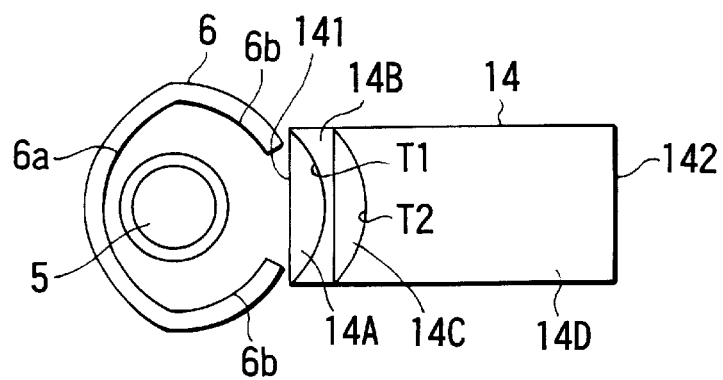
FIG. 9 is a diagrammatic cross-sectional view aiding in explaining an illuminating system according to a second embodiment of the present invention.

Referring to FIG. 9, a light guide member 14 is composed of four layers 14A, 14B, 14C and 14D having different refractive indices, and has a flat external shape. The layers 14A and 14C are higher refractive index layers, while the layers 14B and 14D are lower refractive index layers. The second embodiment differs from the first embodiment in that the layers of different refractive index materials are arrayed in the direction of a light exit surface 142 (hereinafter referred to as the optical-axis direction for convenience's sake) and in that bonded surfaces are formed as curved surfaces. With this arrangement, it is possible to obtain an effect similar to that obtainable when a plurality of convex lenses are disposed at a light entrance surface 141.

The state of ray tracing through the light guide member 14 having the above-described shape will be described below with reference to FIGS. 10 to 12. For the sake of simplicity of description, reference will be made to light rays emitted from the center of the flash emission tube 5.

Figure 10:
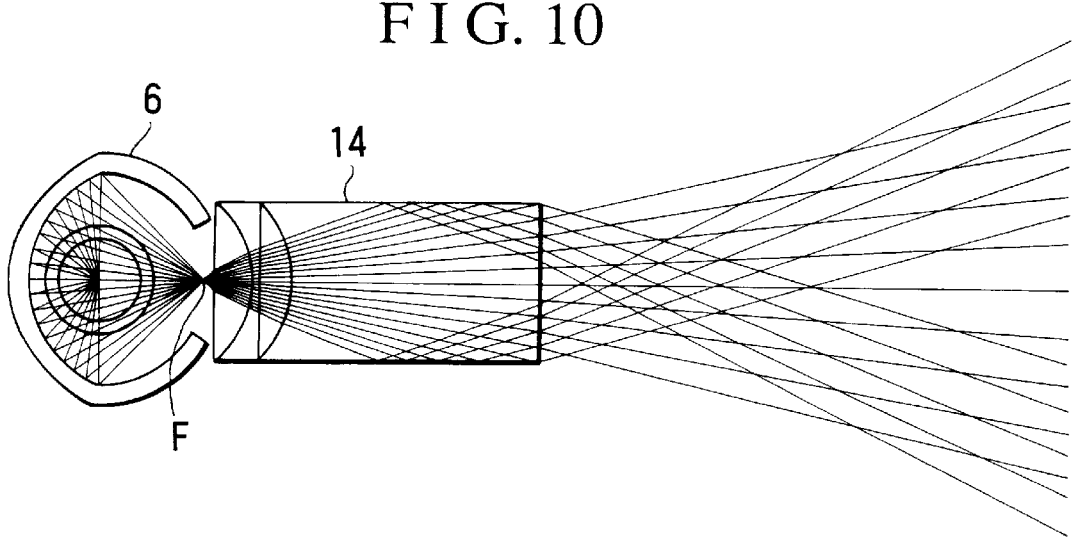
FIG. 10 is a ray-tracing diagram showing light rays reflected by a rear surface which are traced through the illuminating system according to the second embodiment of the present invention.

As shown in FIG. 10, light rays emitted rearwardly from the center of the flash emission tube 5 which is disposed at the first focal position of the reflector 6 are reflected by the elliptic reflecting surface 6a of the reflector 6 and focused at the second focal position F of the elliptic reflecting surface 6a. (For the sake of simplicity of description, the influence of the glass tube of the flash emission tube 5 itself is ignored). Since the higher refractive index layer 14A of the light guide member 14 is disposed in the vicinity of the second focal position F, the reflected light rays focused at the second focal position F enter into and are refracted by the higher refractive index layer 14A. Then, the refracted light rays are made incident on the boundary T1 between the higher refractive index layer 14A and the lower refractive index layer 14B. Since this boundary T1 is formed as a curved surface, the incident angles of the light rays are small and the light rays are insusceptible to refraction at the boundary T1.

The light rays pass through the lower refractive index layer 14B into the higher refractive index layer 14C and are further refracted by the higher refractive index layer 14C. Finally, the light rays enter from the higher refractive index layer 14C into the lower refractive index layer 14D. At this time, since the boundary T2 is formed as a curved surface, the incident angles of the light rays are small and variations in the angles due to refraction can be reduced.

As described above, the higher refractive index layer 14A and the lower refractive index layer 14B are disposed in that order in the vicinity of the light entrance surface 141 of the light guide member 14, and the higher refractive index layer 14A and the lower refractive index layer 14B are respectively formed in the shape of a convex lens and in the shape of a concave lens, so that the light guide member 14 can be given a light-gathering effect.

Figure 11:
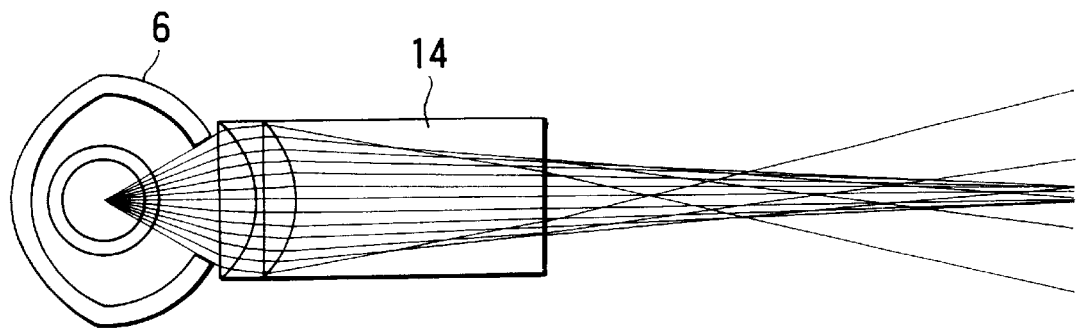
FIG. 11 is a ray-tracing diagram showing direct light rays which are traced through the illuminating system according to the second embodiment of the present invention.

FIG. 11 shows a state in which light rays emitted from the center of the flash emission tube 5 directly enter the light guide member 14. As shown in FIG. 11, the higher refractive index layer 14A and the higher refractive index layer 14C have the effect of a convex lens, and can gain the characteristic of gathering the light rays toward one point after they have exited from the light guide member 14.

Figure 12:
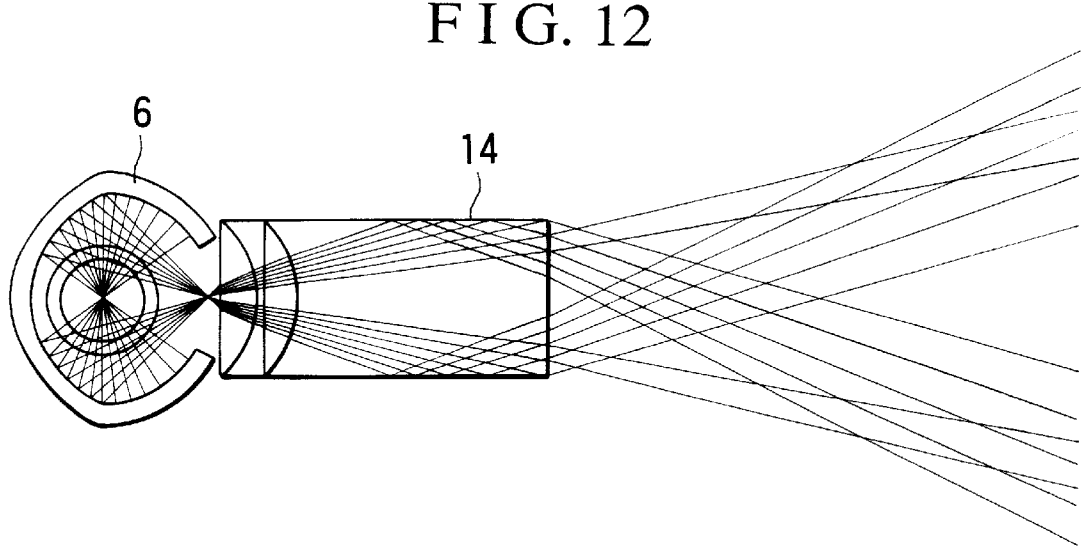
FIG. 12 is a ray-tracing diagram showing light rays reflected by a front surface which are traced through the illuminating system according to the second embodiment of the present invention.

FIG. 12 shows light rays which are emitted from the flash emission tube 5 and fall on a cylindrical reflecting surface 6b. The light rays, after reflected by the cylindrical reflecting surface 6b, pass through the center of the flash emission tube 5 and travel rearwardly toward the elliptic reflecting surface 6a. The light rays are reflected by the elliptic reflecting surface 6a and focused at the second focal position F. The subsequent optical path is identical to that shown in FIG. 10.

As described above, each of the higher refractive index layers 14A and 14C is thick in its central portion and thin in its marginal portion, whereas each of the lower refractive index layers 14B and 14D is thin in its central portion and thick in its marginal portion, and these layers 14A to 14D are arrayed in the optical-axis direction in the vicinity of the light entrance surface 141 of the light guide member 14. Accordingly, it is possible to vary the light-gathering characteristic of the light guide member 14 without changing the external shape thereof.

Although in the second embodiment two higher refractive index layers and two lower refractive index layers, a total of four layers, are formed, the number of layers may be increased or only two layers may be combined. In either case, it is possible to vary the degree of light gathering by varying the difference in refractive index between higher and lower refractive index layers or the curvatures of the respective layers.

Although in the second embodiment each of the layers has one plane surface, the present invention is not limited to such a shape. For example, the boundaries among all of the refractive index layers may be formed by convex or concave surfaces, whereby light rays can be gathered far more efficiently. In addition, as the difference in refractive index is made larger, light rays can be gathered far more efficiently.

Third Embodiment

Figure 13:
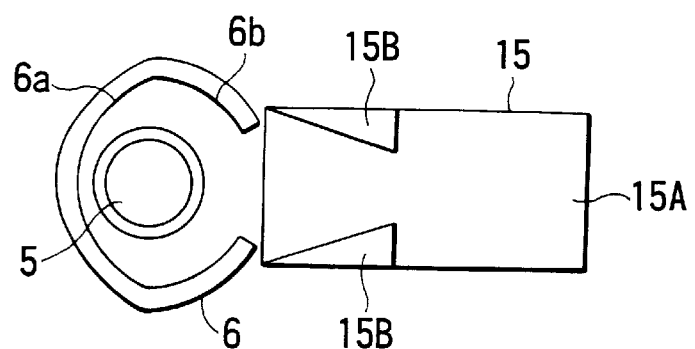
FIG. 13 is a diagrammatic cross-sectional view aiding in explaining an illuminating system according to a third embodiment of the present invention.
Figure 14:
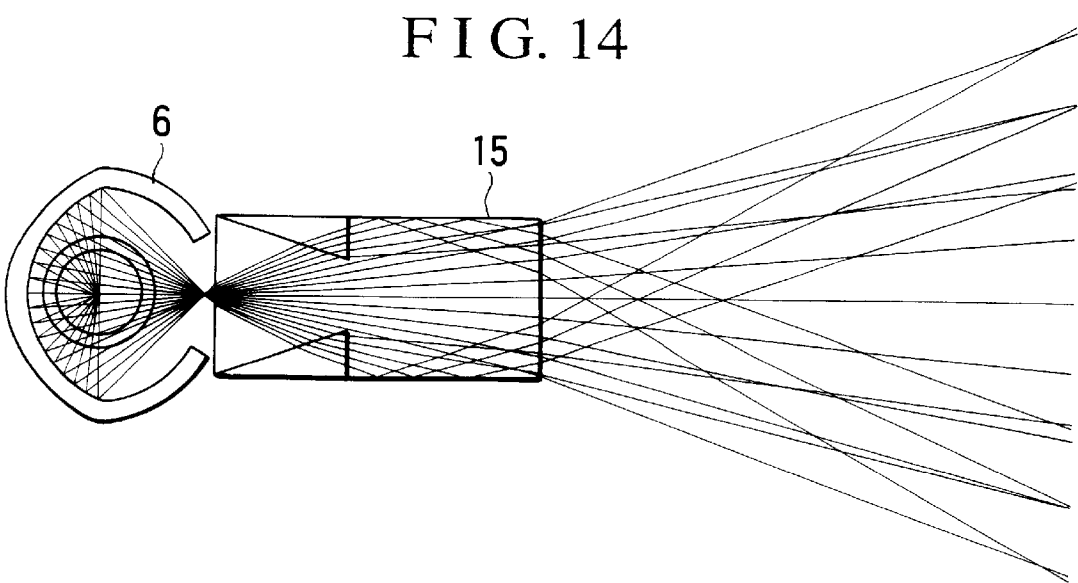
FIG. 14 is a ray-tracing diagram showing light rays reflected by a rear surface which are traced through the illuminating system according to the third embodiment of the present invention.
Figure 15:
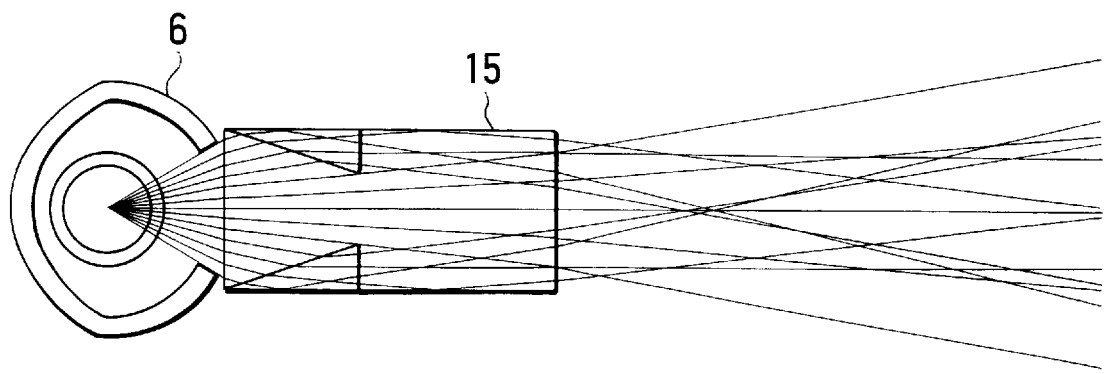
FIG. 15 is a ray-tracing diagram showing direct light rays which are traced through the illuminating system according to the third embodiment of the present invention.

FIGS. 13 to 15 are views aiding in explaining a third embodiment of the present invention. Since the arrangement of the third embodiment is similar to that of the first embodiment, the following description will refer to only the distinctive portions of the third embodiment.

Referring to FIG. 13, a light guide member 15 includes a higher refractive index portion 15A and lower refractive index portions 15B having triangular cross sections. The third embodiment is characterized by an arrangement having an intermediate characteristics between the first and second embodiments. The characteristics of the shape of the third embodiment will be described below with reference to the ray-tracing diagrams shown in FIGS. 14 and 15. As shown in FIG. 14, light rays, which are emitted rearwardly from the center of the flash emission tube 5 and reflected by the elliptic reflecting surface 6a of the reflector 6, are focused at the second focal position F of the elliptic reflecting surface 6a and enter the light guide member 15. Light rays which enter the light guide member 15 in the vicinity of the optical axis thereof enter the higher refractive index portion 15A and directly exit therefrom, whereas light rays which travel toward the marginal portion of the light guide member 15, particularly, only light rays which enter the lower refractive index portions 15B at large incident angles, are controlled and gathered by the triangular portions of the lower refractive index portions 15B which have the effect of a concave lens as described above in connection with the second embodiment.

FIG. 15 is an optical-path diagram of light rays which are emitted from the flash emission tube 5 and pass through the light guide member 15. As can be seen from FIG. 15, in this case as well, the light rays are effectively gathered by the triangular portions of the lower refractive index layers 15B and exit from the light exit surface of the light guide member 15.

Fourth Embodiment

Figure 16:
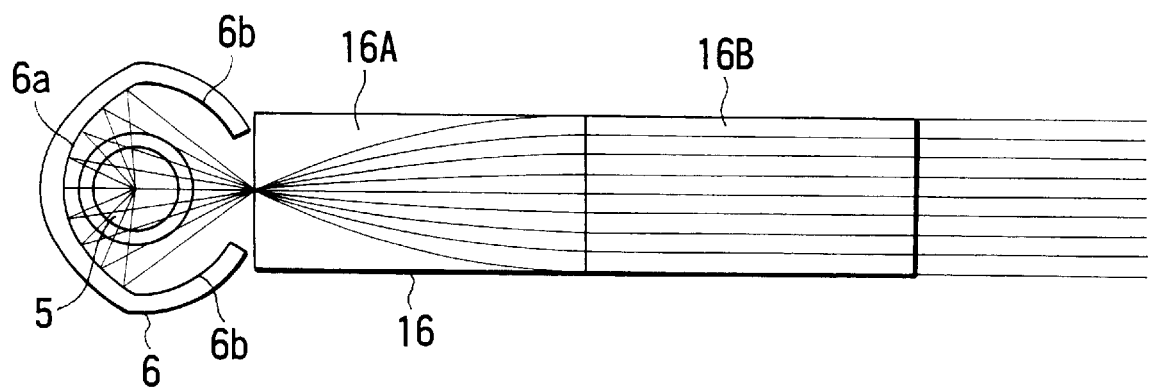
FIG. 16 is a diagrammatic cross-sectional view aiding in explaining an illuminating system according to a fourth embodiment of the present invention.

FIG. 16 is a view aiding in explaining a fourth embodiment of the present invention. Since the entire arrangement of the fourth embodiment is similar to that of the first embodiment, the following description will refer to only the distinctive portions of the fourth embodiment.

Referring to FIG. 16, a light guide member 16 includes a distributed refractive index member 16A and a uniform refractive index member 16B. The distributed refractive index member 16A is composed of a distributed refractive index type of optical material whose refractive index parabolically continuously varies, and has a higher refractive index in its central portion and a lower refractive index in its marginal portion. The length of the distributed refractive index member 16A in the optical-axis direction is limited to a predetermined length, as will be described later. The uniform refractive index member 16B has a uniform refractive index distribution and is connected to an end face of the distributed refractive index member 16A. The length of the uniform refractive index member 16B in the optical-axis direction is set to an arbitrary length according to the overall length of an illuminating optical system to be used.

FIG. 16 also shows ideal ray tracing obtainable in the shown illuminating optical system.

Light rays emitted rearwardly from the center of the flash emission tube 5 are focused at a second focal position of the elliptic reflecting surface 6a. The light rays enter both the central portion of the light guide member 16 and the vicinity of the central portion through the light entrance surface of the light guide member 16 which is disposed in the vicinity of the second focal position, and the light rays are made approximately parallel in the distributed refractive index member 16A. The thus-obtained approximately parallel light rays enter the uniform refractive index member 16B and are conducted to a predetermined position with the states of the light rays maintained.

This method is particularly useful in a case where light rays from a light source are gathered on an optical axis to a sufficient extent by a reflector or the like or the light entrance surface of a light guide member is equivalently large with respect to a light source.

It is to be noted that the length of the distributed refractive index member 16A is exactly half the length of an image formation-related element which is formed by a distributed refractive index type of lens such as a SELFOC (a trade mark of Nippon Sheet Glass Co., Ltd.) lens or a rod lens.

The length of the distributed refractive index member 16A is not limited to only the aforesaid length, and it is desirable to select an optimum length according to the characteristics of light rays which enter the light guide member.

As is apparent from the foregoing description, any of the illuminating devices according to the present embodiments has the advantage of enabling arbitrary control of light-gathering characteristics irrespective of the external shape of a light guide member, thereby making it possible to realize an efficient illuminating optical system.

If any of the illuminating devices according to the present embodiments is used as a flash device for a photographing apparatus such as a camera, a light guide member having an arbitrary length can be used, so that the light exit surface of the light guide member can be separated from the photographing optical axis of the photographing apparatus. It is, therefore, possible to prevent a red-eye phenomenon which is a problem occurring during photography using a flash device.

Furthermore, an emission part having a thin and compact form can be realized, and its light-gathering characteristics can be set to an optimum state. In addition, since the optical system of the light guide member has a comparatively simple arrangement, an emission part having an inexpensive arrangement can be realized.

I claim:

1. An illuminating device comprising
a light source; and
a light guide member which allows light supplied by said light source to enter said light guide member and guides the light to a predetermined light exit position while totally reflecting the light in said light guide member,
said light guide member having, in a vicinity of a light entrance surface of said light guide member, a nonuniform refractive index distribution for making a light distribution characteristic different between a light entrance side and a light exit side.

2. An illuminating device according to claim 1, wherein said light guide member includes, in the vicinity of the light entrance surface, a plurality of members made from optical members having different refractive indices.

3. An illuminating device according to claim 2, wherein, in the vicinity of the light entrance surface, a refractive index of a marginal member of said light guide member is low compared to a refractive index of a central member of said light guide member.

4. An illuminating device according to claim 3, wherein said light guide member has, in the vicinity of the light entrance surface, a plurality of refractive index layers having different refractive indices which become lower from a central layer to a marginal layer.

5. An illuminating device according to claim 3, wherein, in the vicinity of the light entrance surface, the marginal member of said light guide member which is lower in refractive index than the central member becomes larger in thickness toward a light exit surface of said light guide member.

6. An illuminating device according to claim 2, wherein said light guide member has, in the vicinity of the light entrance surface, a member of relatively higher refractive index and a member of relatively lower refractive index which are arrayed alternately in a direction closer to a light exit surface of said light guide member.

7. An illuminating device according to claim 6, wherein the member of relatively higher refractive index has a positive power, whereas the member of relatively lower refractive index has a negative power.

8. An illuminating device according to claim 1, wherein said light guide member has a distributed refractive index type of member whose refractive index continuously varies, on a side closer to the light entrance surface.

9. An illuminating device according to claim 1, wherein said light guide member has a uniform refractive index distribution in a vicinity of a light exit surface of said light guide member.

10. An illuminating device according to claim 1, further comprising a light gathering member for gathering the light from said light source in a direction of said light guide member.

11. An illuminating device according to claim 10, wherein said light gathering member is a reflecting mirror composed of a combination of an elliptical cylindrical mirror and a cylindrical mirror, said light source being disposed at a position where one focus of the elliptical cylindrical mirror and the center of the cylindrical mirror are located, the light supplied by said light source exiting toward said light guide member from an opening provided in the cylindrical mirror.

12. An illuminating device according to claim 1, wherein said light source includes a flash emission tube.

13. An illuminating device according to claim 11, wherein said illuminating device includes a flash device for a camera.

14. A photographing apparatus comprising:
a photographing optical system for photographing an image of an object; and
an illuminating system for illuminating the object, said illuminating system including:
a light source; and
a light guide member which allows light supplied by said light source to enter said light guide member and guides the light to a predetermined light exit position while totally reflecting the light in said light guide member,
said light guide member having, in a vicinity of a light entrance surface of said light guide member, a non-uniform refractive index distribution for making a light distribution characteristic different between a light entrance side and a light exit side.

15. A photographing apparatus according to claim 14, wherein said light guide member includes, in the vicinity of the light entrance surface, a plurality of members made from optical members having different refractive indices.

16. A photographing apparatus according to claim 15, wherein, in the vicinity of the light entrance surface, a refractive index of a marginal member of said light guide member is low compared to a refractive index of a central member of said light guide member.

17. A photographing apparatus according to claim 16, wherein said light guide member has, in the vicinity of the light entrance surface, a plurality of refractive index layers having different refractive indices which become lower from a central layer to a marginal layer.

18. A photographing apparatus according to claim 16, wherein, in the vicinity of the light entrance surface, the marginal member of said light guide member which is lower in refractive index than the central member becomes larger in thickness toward a light exit surface of said light guide member.

19. A photographing apparatus according to claim 15, wherein said light guide member has, in the vicinity of the light entrance surface, a member of relatively higher refractive index and a member of relatively lower refractive index which are arrayed alternately in a direction closer to a light exit surface of said light guide member.

20. A photographing apparatus according to claim 19, wherein the member of relatively higher refractive index has a positive power, whereas the member of relatively lower refractive index has a negative power.

21. A photographing apparatus according to claim 14, wherein said light guide member has a distributed refractive index type of member whose refractive index continuously varies, on a side closer to the light entrance surface.

22. A photographing apparatus according to claim 14, wherein said light guide member has a uniform refractive index distribution in a vicinity of a light exit surface of said light guide member.

23. A photographing apparatus according to claim 15, further comprising a light gathering member for gathering the light from said light source in a direction of said light guide member.

24. A photographing apparatus according to claim 23, wherein said light gathering member is a reflecting mirror composed of a combination of an elliptical cylindrical mirror and a cylindrical mirror, said light source being disposed at a position where one focus of the elliptical cylindrical mirror and the center of the cylindrical mirror are located, the light supplied by said light source exiting toward said light guide member from an opening provided in the cylindrical mirror.

25. A photographing apparatus according to claim 14, wherein said light source includes a flash emission tube.

* * * * *

UNITED STATES PATENT AND TRADEMARK OFFICE
CERTIFICATE OF CORRECTION

PATENT NO. : 5,926,658
DATED : July 20, 1999
INVENTOR(S) : YOSHIHARU TENMYO

It is certified that error appears in the above-identified patent and that said Letters Patent is hereby corrected as shown below:

Column 1

Line 9, "enters" should read --enter--.

Column 4

Line 9, "a" should read --$\alpha$--.
    Line 58, "$\sin \alpha = n_N \cdot \sin\theta_\alpha, \ldots (1\text{-}1)$" should read --$\sin \alpha = n_H \cdot \sin\theta_\alpha, \ldots (1\text{-}1)$--.
    Line 60, "$\sin \beta = n_N \cdot \sin\theta_\beta, \ldots (1\text{-}2)$" should read --$\sin \beta = n_H \cdot \sin\theta_\beta, \ldots (1\text{-}2)$--.
    Line 62, "$\sin \gamma = n_N \cdot \sin\theta_\gamma. \ldots (1\text{-}3)$" should read --$\sin \gamma = n_H \cdot \sin\theta_\gamma. \ldots (1\text{-}3)$--.

Column 9

Line 60, "a" should read --$\alpha$--.

Column 10

Line 12, "$n_M \cdot \sin(90° - \phi_\beta) = n_N \cdot \sin\theta_\alpha, \ldots (8\text{-}1)$" should read --$n_M \cdot \sin(90° - \phi_\beta) = n_H \cdot \sin\theta_\alpha, \ldots (8\text{-}1)$.
    Line 35, "a" should read --$\alpha$--.

Column 11

Line 40, "a=30.0°," should read --$\alpha$=30.0°,--

UNITED STATES PATENT AND TRADEMARK OFFICE
CERTIFICATE OF CORRECTION

PATENT NO. : 5,926,658
DATED : July 20, 1999
INVENTOR(S) : YOSHIHARU TENMYO

It is certified that error appears in the above-identified patent and that said Letters Patent is hereby corrected as shown below:

Column 11

Line 50, "a=30.0°," should read --$\alpha$=30.0°,--

Column 13

Line 25, "$\beta=\sin^{-1}(n_N \cdot \sin\theta_\beta)=44.9951$," should read --$\beta=\sin^{-1}(n_H \cdot \sin\theta_\beta)=44.9951$,--.
Line 30, "a=30.0°," should read --$\alpha$=30.0°,--.
Line 38, "of the" should read --of--.
Line 39, "amount of" should be deleted.
Line 58, "entire" should read --overall--.

Column 15

Line 25, "arrangement" should read --overall arrangement--.

Column 17

Line 2, "comprising" should read --comprising:--.

Signed and Sealed this

Twenty-third Day of May, 2000

Attest:

Q. TODD DICKINSON

*Attesting Officer*   *Director of Patents and Trademarks*